(No Model.)
S. J. ROSENFELD.
FENDER FOR TRAM CARS.
No. 521,672.  Patented June 19, 1894.
Fig. 1
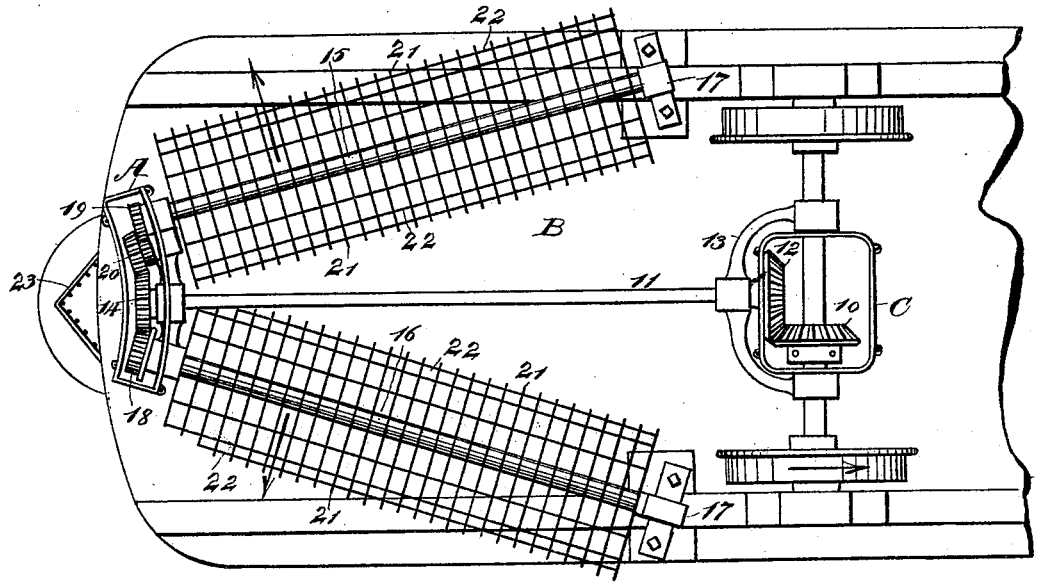
Fig. 2
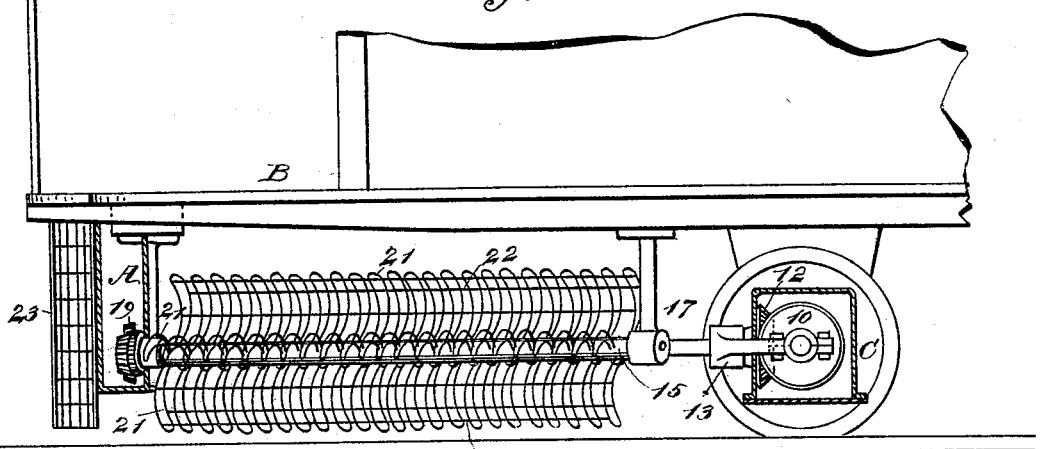
Fig. 4
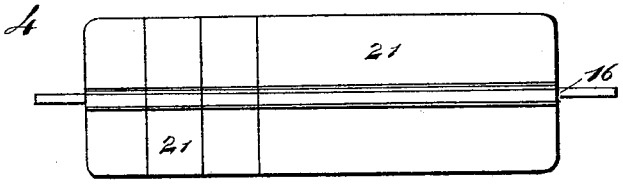
WITNESSES:  Fig. 3   Fig. 5   INVENTOR
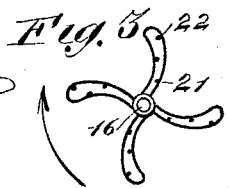
S. J. Rosenfeld
BY
Munn & Co.
ATTORNEYS.

UNITED STATES PATENT OFFICE.

SAMUEL J. ROSENFELD, OF NEW YORK, N. Y., ASSIGNOR, BY DIRECT AND MESNE ASSIGNMENTS, TO HIMSELF, AND JOSEPH A. LOUCHHEIM AND EDWIN S. SIMON, OF PHILADELPHIA, PENNSYLVANIA.

FENDER FOR TRAM-CARS.

SPECIFICATION forming part of Letters Patent No. 521,672, dated June 19, 1894.

Application filed November 4, 1893. Serial No. 489,981. (No model.)

*To all whom it may concern:*

Be it known that I, SAMUEL J. ROSENFELD, of New York city, in the county and State of New York, have invented a new and Improved Fender for Tram-Cars, of which the following is a full, clear, and exact description.

My invention relates to a fender for tram cars, and it has for its object to provide a fender capable of being conveniently and expeditiously attached to any car, and which when applied will be concealed by the platform.

Another feature of the invention is to provide a means whereby the fender will be a rotary one, and will be driven automatically as the car advances.

Another feature of the invention is to so construct the rotary fender that it will cause any object brought in contact with it to be thrown away from the car, and entirely out of its path.

Another feature of the invention is to construct the fender in a simple yet durable manner.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a bottom plan view of a portion of a car having the improved fender applied. Fig. 2 is a side elevation of the forward portion of a car, and a perspective view of one of the fenders. Fig. 3 is an end view of one of the fenders. Fig. 4 is a front elevation of a slightly modified form of the fender; and Fig. 5 is an end view of the fender illustrated in Fig. 4.

In carrying out the invention a bracket A, is projected downward from the forward central portion of the platform B of the car, and a box C, is supported upon the axle of the car in such manner as not to interfere with the turning of the axle. Within the box a beveled gear 10 is securely fastened upon the axle, and one end of a shaft 11, is projected in the box, and is provided with a beveled gear 12, meshing with the gear 10. The shaft is supported by a suitable bracket or hanger 13, in its turn supported upon the axle of the car, and the shaft extends longitudinally beneath the platform B, its forward end being journaled in the bracket A, the said bracket being provided with an inner chamber to form a housing for a gear 14, secured upon the forward end of the drive shaft 11.

In addition to the shaft 11, two other driven shafts are employed, designated respectively as 15 and 16. One of these shafts is located at each side of the driving shaft 11, and usually the driven shafts 15 and 16, are diagonally placed with respect to the bottom of the platform B, one end of each shaft 15 and 16 being journaled in an end portion of the forward bracket A, while the rear end of each shaft is journaled in a fixed hanger 17, located near the outside of the body of the car, or rear portion of its platform B, as is best shown in Fig. 1. Both shafts 15 and 16, are adapted to turn in the same direction; that is, in an upward direction from the ground beneath the platform, and the said shafts 15 and 16 are driven from the main shaft 11, the shaft 16, being provided with a gear 18, located in the chamber of the bracket A, which meshes with the forward gear 14 of the said main shaft 11. The shaft 15, is likewise provided at its forward end with a gear 19, and the gear 19 meshes with the inner portion of a double gear 20, journaled in the chamber of the bracket A, the outer portion of the double gear meshing with the gear 14 of the drive shaft, as is also best shown in Fig. 1. The shafts 15 and 16 may be properly denominated fender shafts, as each shaft has preferably projected therefrom arms 21, the arms being somewhat in stellated arrangement, as shown in Figs. 2 and 3; and each arm is curved in the same direction, as shown in the same figures, the convexed side of each arm being the ascending side, and faces outward when the fender shafts are revolved; therefore, whatever the object with which they may come in contact, it will be thrown out from the car beyond its sides.

The fender arms 21, are preferably made as shown in Figs. 2 and 3, in which each arm is shown as consisting of stout wire doubled upon itself, a space intervening between the strands; and usually the space is made wider at the outer ends of the arms than at any other point, and the said outer ends of the arms are more or less cylindrical. When the arms are made as shown in Figs. 2 and 3, the aligning arms of each shaft are braced and connected by rods 22.

If in practice, however, it is found desirable, the fender arms may be made of sheet metal, or of any material adapted for the purpose in sheet form, and in this event, as shown in Figs. 4 and 5, each arm may be made quite wide, as illustrated at the left in Fig. 4, or a single arm may be made to extend the length of a shaft, as is practically shown at the right in Fig. 4; but in every event the arms will be curved so that they will be more or less stellated in cross section, as shown in said Fig. 5.

I desire it to be understood that if desired the side fender shafts may be made to extend parallel with the sides of the car, one in front of each wheel, and that when this arrangement is adopted, a third fender shaft will be located transversely beneath the front of the platform. When, however, the arrangement of the fender shaft shown in the drawings is preferred, a triangular pilot 23, is located at the front central portion of the platform, and extends downward to within a suitable distance from the ground between the rails, as shown in both Figs. 1 and 2. This pilot consists preferably, as shown in the drawings, of a body frame and a lattice body, but it may be otherwise constructed if desired. The pilot will serve to direct any body that may be struck by it to the sides of the platform, where the said body or object will be acted upon by one of the fenders, in such a manner as to throw it from the path of the car.

It will be understood that instead of four arms projecting circumferentially from the shaft two or more may be employed.

Having thus described my invention, I claim as new and desire to secure by Letters Patent—

1. A rotary car fender, consisting of a shaft and arms rotating therefrom, the said arms being convexed upon ascending faces, substantially as shown and described.

2. In a car fender, the combination, with a car platform, of fender shafts located beneath the platform, a driving mechanism connecting the shafts with an axle of the car, and a series of curved arms radiating from each shaft, the arms being arranged in rows longitudinally of the shaft and in substantially stellated order, the shaft being revolved in a manner to carry the convexed surfaces of the arms upward, as and for the purpose specified.

3. In a car fender, the combination, with a car platform, of fender shafts located beneath the platform, a driving mechanism connecting the shafts with an axle of the car, a series of curved arms radiating from each shaft, the arms being arranged in rows longitudinally of the shaft and in substantially stellated order, the shaft being revolved in a manner to carry the convexed surfaces of the arms upward, and a pilot located in front of the outer ends of the fender shafts, inclining in direction of said shafts, substantially as and for the purpose specified.

SAMUEL J. ROSENFELD.

Witnesses:
J. FRED ACKER,
E. M. CLARK.